United States Patent [19]

Lamonde et al.

[11] Patent Number: 5,455,672
[45] Date of Patent: Oct. 3, 1995

[54] MEASUREMENT OF ATTENUATION OF AN OPTICAL FIBER USING BIDIRECTIONAL TRANSMISSION OF INFORMATION VIA THE FIBER

[75] Inventors: Joseph E. G. Lamonde, Cap-Rouge; Jean LaFlamme, Quebec; Michel Cyr, Vanier, all of Canada

[73] Assignee: Exto-Electro-Optical Engineering Inc., Vanier, Canada

[21] Appl. No.: 229,316

[22] Filed: Apr. 18, 1994

Related U.S. Application Data

[63] Continuation-in-part of Ser. No. 822,785, Jan. 21, 1992, Pat. No. 5,305,078.

[51] Int. Cl.⁶ ........................................ G01N 21/59
[52] U.S. Cl. ........................................ 356/73.1
[58] Field of Search ............................... 356/73.1

[56] References Cited

U.S. PATENT DOCUMENTS

| | | | |
|---|---|---|---|
| 4,234,253 | 11/1980 | Higginbotham et al. | 356/73.1 |
| 4,673,291 | 6/1987 | Heckmann | 356/73.1 |
| 4,726,676 | 2/1988 | Maslaney et al. | 356/73.1 |
| 4,737,026 | 4/1988 | Dalgoutte et al. | 356/73.1 |
| 4,737,027 | 4/1988 | Maeda | 356/73.1 |
| 4,799,790 | 1/1989 | Tsukamoto et al. | 356/73.1 |
| 4,901,003 | 2/1990 | Clegg | 324/66 |

*Primary Examiner*—Vincent P. McGraw
*Attorney, Agent, or Firm*—Thomas Adams

[57] ABSTRACT

Attenuation of an optical fiber is measured by transmitting an optical signal having a predetermined wavelength to the fiber, and FSK modulating the optical signal with information identifying the wavelength and transmitted power of the optical signal. At a receiver, the optical signal is detected and the information is recovered by demodulation. Wavelength-dependent sensitivity information for the detector is read from a store in dependence upon the wavelength information and used to control the gain of an amplifier for amplifying a subsequently transmitted continuous wave optical signal used for attenuation measurement. The received power level of this optical signal is converted into a digital value and used with the transmitted power information to determine the fiber attenuation at the predetermined wavelength. Reference power levels are determined by connecting a jumper between a port and an external detector. Measurement of attenuation and communication data over the fiber under test may be effected using two transceiver units, one at each end of the fiber. In addition to the external detector, each unit has an internal detector and sources connected to a port which is connected to the fiber under test by a jumper. Determination of the attenuation of the fiber then takes account of the loss of each fiber using reference power levels determined by initial calibration measurements.

19 Claims, 3 Drawing Sheets

MEASUREMENT OF ATTENUATION OF AN OPTICAL FIBER USING BIDIRECTIONAL TRANSMISSION OF INFORMATION VIA THE FIBER

This is a continuation-in-part of patent application Ser. No. 07/822,785, filed Jan. 21, 1992, (U.S. Pat. No. 5,305, 078).

BACKGROUND OF THE INVENTION

1. Technical Field

This invention relates to the measurement of attenuation of optical fibers in an optical communications system, and is particularly concerned with a method of and apparatus for facilitating attenuation measurements at different optical signal wavelengths.

2. Background Art

With increasing use of optical communications systems, it has become increasingly important to provide for appropriate testing of optical fibers in fiber cables of such systems. A fiber cable of an optical communications system may comprise a large number, for example 48, of individual optical fibers, and may extend over a large distance of many kilometres between its ends. It is desirable to be able to measure characteristics of each fiber in such a cable, in particular the attenuation of optical signals at two or more different optical signal wavelengths, such as 1300 and 1550 nm., which are typically used in optical communications systems. The attenuation measurements can desirably include measurement of attenuation of optical signals in each direction at each wavelength on each fiber, and total return loss of an optical fiber path, which may also include optical fiber connectors and splices which give rise to increased losses.

In order to carry out such measurements, it is known to provide two test units which are employed, one at each end of a fiber cable, to test the fibers by transmitting an optical signal via each fiber between the units, in each case determining the optical signal attenuation at the receiving end. Such an arrangement requires that the units be calibrated with respect to one another. For such calibration, typically the units are brought together and optically coupled via a jumper, and the receiving unit stores for each wavelength a reference power level of the received optical signal, which stored reference is used for determining attenuation during subsequent testing. However, this has disadvantages in that the jumper must then remain connected for accurate testing, making it difficult to test fibers with different connectors, and there is a risk of the stored references being erased through operator error. In consequence, re-calibration is frequently necessary, requiring that the units again be brought together as described above.

In Higginbotham et al. U.S. Pat. No. 4,234,253 issued Nov. 18, 1980 and entitled "Attenuation Measuring System" there is described a fiber optic attenuation measuring arrangement in which a feedback loop is used in a transmitter to maintain a constant output power level of a transmitted optical signal, which includes a test signal together with a higher-amplitude timing pulse. At a receiver, the timing pulse is separated and used to demodulate the test signal, which is compared with a reference signal to determine attenuation of a fiber under test. This reference is not concerned with measuring attenuation at different optical signal wavelengths.

In Heckmann U.S. Pat. No. 4,673,291 issued Jun. 16, 1987 and entitled "Method of and Device for Measuring the Attenuation In Optical Waveguides" there is described an optical attenuation measuring arrangement in which the light power of an optical signal input to a fiber is encoded on the signal using pulse frequency modulation, and this is demodulated at the receiver to be used in determining attenuation of the optical signal by the fiber. This reference also is not concerned with measuring attenuation at different optical signal wavelengths.

In Maslaney et al. U.S. Pat. No. 4,726,676 issued Feb. 23, 1988 and entitled "Optical Signal Power Measurement Method and Apparatus" there is described an optical attenuation measuring arrangement in which optical test signals of different wavelengths are modulated with respective AC signals to identify the respective wavelengths to a receiver. A comparison value, which takes into account the wavelength-dependent sensitivity of a detector of the receiver, is stored in the receiver for each optical signal wavelength and is used with a received optical signal power level to determine attenuation of the optical signal transmitted via an optical fiber. This arrangement assumes a constant power level of the transmitted optical signal, and requires as many different modulating AC signal frequencies as there are optical signal wavelengths.

An object of this invention, therefore, is to provide an improved method of measuring attenuation of an optical fiber, and improved apparatus for use in carrying out this method.

SUMMARY OF THE INVENTION

According to one aspect of this invention there is provided a method of measuring attenuation of an optical fiber using a transmitter unit having an optical source, a port, an optical detector and storage means, the source being connected to the port, comprising the steps of, at the transmitter:

connecting a jumper between the port and the optical detector, transmitting from the source an optical signal having a predetermined wavelength, measuring at the detector a reference power level of the transmitted signal, and storing the measured reference power level in the storage means;

connecting the jumper between the port and an adjacent end of the optical fiber;

transmitting an optical signal having the predetermined wavelength to the fiber; and modulating the optical signal with information identifying the previously measured reference power level;

and, at a receiver:

detecting the optical signal received from the fiber;

demodulating the detected optical signal to recover the transmitted reference power level information;

monitoring a received power level of the optical signal; and determining attenuation of the optical fiber at the predetermined wavelength from the recovered transmitted power information and the monitored received power level.

The transmitter unit may comprise a plurality of sources having different wavelengths and means for selecting a source for transmission, and the method further comprise the step of modulating the optical signal at the transmitter unit with information identifying the wavelength of the optical signal and, at the receiver, reading wavelength-dependent detection sensitivity information in dependence upon the recovered wavelength information, the step of demodulating recovering the wavelength information, and the step of determining attenuation using the detection sensitivity information.

According to another aspect, the invention provides a method of measuring attenuation of an optical fiber using two transceiver units, one at each end of the optical fiber, each transceiver unit comprising a port, an optical source, a first optical detector, a second optical detector, storage means, means for controlling the optical source and the first detector to the port for selectively transmitting optical signals to, and receiving optical signals from, the optical fiber via the port, and data storage means;

the method comprising the steps of, at each unit:

connecting a first jumper between the port and the second optical detector and causing the source to transmit an optical signal having a predetermined wavelength to the second detector, measuring the power level of the optical signal when received by the second detector and storing it in the storage means as a primary reference power level;

removing the first jumper and connecting a second jumper between the port and the second detector, causing the source to retransmit the optical signal, measuring the power level of the optical signal when received by the second detector and storing it in the storage means as a transmitted reference power level; the method further comprising the steps of connecting the second jumper between the port and an adjacent end of the optical fiber and;

at one of the units;

modulating an optical signal from its source with information representing said transmitted power reference level and transmitting the modulated optical signal via its port and jumper to the optical fiber;

at the other of the units:

detecting, using its first detector, the optical signal received via its jumper and port from the optical fiber;

demodulating the detected optical signal to recover information as to the transmitted reference power level of the detected optical signal; and determining attenuation of the optical fiber at the predetermined wavelength using the power level of the received optical signal measured at its first detector, the recovered transmitted reference power level demodulated from the detected optical signal, and the primary reference power level and transmitted reference power level from its storage means.

Embodiments of this second aspect may further comprise the step of calibrating each unit to determine a level of signal loss between the optical port and the first detector, the attenuation measurement taking account of said signal loss.

In embodiments of either aspect, preferably the steps of monitoring a received power level of the optical signal and determining attenuation of the optical fiber comprise the step of amplifying the detected optical signal with a gain dependent upon the detection sensitivity information to produce a wavelength-independent received power level signal. The step of monitoring the received power level of the optical signal preferably comprises the step of converting the wavelength-independent received power level signal to a digital value.

The optical signal is preferably transmitted as a continuous wave signal following the modulation with said information, and the monitoring step preferably comprises monitoring a received power level of the continuous wave signal.

This ensures that the modulation of the optical signal with information does not adversely affect the monitoring and hence the determination of the attenuation of the optical fiber, regardless of the particular type of modulation which is used.

According to another aspect, this invention provides apparatus for use in measuring attenuation of an optical fiber, comprising: an optical source and an optical detector; jumper means for connecting the optical source, alternatively, to the optical detector and the optical fiber; means for controlling the optical source to supply first and second optical signals both having a predetermined wavelength and the same power level; means for storing a reference power level of the first optical signal measured at the optical detector with the jumper means connected thereto; means for modulating the second optical signal with information identifying the stored reference power level; means for demodulating a detected optical signal received from the detector when coupled to an optical fiber to recover information identifying the transmitted power level modulated thereupon; means for determining a power level of the detected signal, and means for determining attenuation of the optical fiber from the recovered transmitted power information and the power level of the detected optical signal.

The unit may comprise a plurality of sources having different operating wavelengths and the controlling means include means for selecting said source from the plurality. The storage means may then store wavelength-dependent sensitivity information for the detector, the modulating means modulate such wavelength-sensitive information onto the second optical signal and the demodulating means demodulate the wavelength-dependent information. The attenuation determining means may then determine the attenuation taking account also the wavelength-dependent information.

According to yet another aspect, apparatus for measuring attenuation of an optical fiber comprises two transceiver units for connection one at each end of the optical fiber, each transceiver unit comprising:

a port, an optical source, a first detector, a second detector, storage means, means connecting the first detector and the optical source to the port, means for controlling the optical source and the first detector to the port for selectively transmitting optical signals to, and receiving optical signals from, the optical fiber via the port, and data storage means for storing power levels of signals received by the detectors;

first jumper means having connectors for connecting it between the port and the second detector and second jumper means having connectors for connecting it between, alternatively, the port and the second detector and between the port and the optical fiber, the first jumper means having significantly lower loss characteristics than the second jumper means;

means for controlling the optical source and the coupling means to supply to the port, alternatively and successively, first, second and third optical signals having the same wavelength and initial power level and storing in the storage means first and second reference power levels of the first and second optical signals measured at the second detector;

means for modulating the third optical signal, prior to transmission via the port, with information representing said first reference power level;

means for demodulating a detected optical signal received by the first detector via the optical fiber having been transmitted as a said third optical signal by another said transceiver unit connected to a distal end of the optical fiber, to recover information as to the transmitted first reference power level of the detected optical signal as modulated thereupon prior to transmission by said another transceiver unit;

means for determining attenuation of the optical fiber at the predetermined wavelength using the reference power level demodulated from the detected optical signal, the second reference power level from the storage means and a measured power level of the detected optical signal.

The first detector and the source may be connected to the port by way of a wave-division multiplexing (WDM) coupler. A beam splitter may connect the second detector and the WDM coupler to the port.

Each first jumper means may comprise a short fiber having a core diameter significantly greater than core diameters of optical fibers interconnecting the source, the detectors and the port.

The storage means may also store a loss factor for an optical path between the port and the first detector and the determining means may determine the attenuation taking account of the stored loss factor. Typically, the loss factor will have been determined before the transceiver unit is put into service.

In use, the first jumper will be in place when the first optical signal is transmitted. The second jumper will be substituted when the second and third optical signals are transmitted, on the one hand connected from port to second detector and on the other hand connected from port to optical fiber.

Conveniently the optical sources comprise a plurality of laser diodes having different emission wavelengths, and the means for modulating and demodulating comprise an FSK modulator and demodulator.

The means for determining attenuation of the optical fiber at the predetermined wavelength preferably comprises means for amplifying the detected optical signal with a gain dependent upon the sensitivity information read from the store to produce a wavelength-independent received power level signal, and means for converting the wavelength-independent received power level signal to a digital value. The variable gain amplification ensures that the signal to be converted to a digital value has a range matched to the range of an A-D converter used for the digital conversion.

The apparatus preferably includes latch means for latching said sensitivity information read from the store and information for selecting said one of the optical sources.

According to yet another aspect of the invention, there is provided a method of measuring attenuation of an optical fiber using two transceiver units at respective ends of the optical fiber, each transceiver unit comprising:

a port, an optical source, a first detector, a second detector, storage means, coupling means coupling the optical source and the first detector to the port for selectively transmitting optical signals to, and receiving optical signals from, the optical fiber;

the storage means storing a primary reference power level previously determined for the source;

connector means connectable, alternatively, between the port and the second detector means to convey a calibration optical signal from the optical source to the second detector, and between the port and the optical fiber to convey an optical signal from the optical fiber to the first detector;

means for controlling the optical source and the coupling means to supply to the port, alternatively and successively, a calibration optical signal and a test optical signal both having the same predetermined wavelength;

means for determining from the second detector a reference power level for the calibration optical signal received by the second detector when connected to the port and storing the reference power level in the storage means, and for determining from the reference power level and the stored primary power level a signal loss for the connecting means;

means for modulating the test optical signal, prior to transmission via the port, with information representing said reference power level;

means for demodulating a detected optical signal received via the port to recover information as to the reference power level of the detected optical signal as modulated onto the detected optical signal prior to transmission by a said transceiver unit connected to the distal end of the optical fiber;

means for determining attenuation of the optical fiber at the predetermined wavelength using the reference power level modulated onto the detected optical signal, and the signal loss for the connecting means.

According to a still further aspect of the invention, there is provided apparatus for measuring attenuation of an optical fiber, comprising, for connection at each end of the optical fiber, a transceiver unit comprising:

a port, an optical source, a first detector, a second detector, storage means, coupling means coupling the optical source and the first detector to the port for selectively transmitting optical signals to, and receiving optical signals from, the optical fiber;

the storage means storing a primary reference power level previously determined for the source;

connector means connectable, alternatively, between the port and the second detector means to convey a calibration optical signal from the optical source to the second detector, and between the port and the optical fiber to convey an optical signal from the optical fiber to the first detector;

means for controlling the optical source and the coupling means to supply to the port, alternatively and successively, a calibration optical signal and a test optical signal both having the same predetermined wavelength;

means for determining from the second detector a reference power level for the calibration optical signal received by the second detector when connected to the port and storing the reference power level in the storage means, and for determining from the reference power level and the stored primary power level a signal loss for the connecting means;

means for modulating the test optical signal, prior to transmission via the port, with information representing said reference power level;

means for demodulating a detected optical signal received via the port to recover information as to the reference power level of the detected optical signal as modulated onto the detected optical signal prior to transmission by a said transceiver unit connected to the distal end of the optical fiber;

means for determining attenuation of the optical fiber at the predetermined wavelength using the reference power level modulated onto the detected optical signal, and the signal loss for the connecting means.

Various objects, features and advantages of the present invention will become more apparent from the following detailed description, taken in conjunction with the accompanying drawings, of preferred embodiments of the invention.

Figure 1:
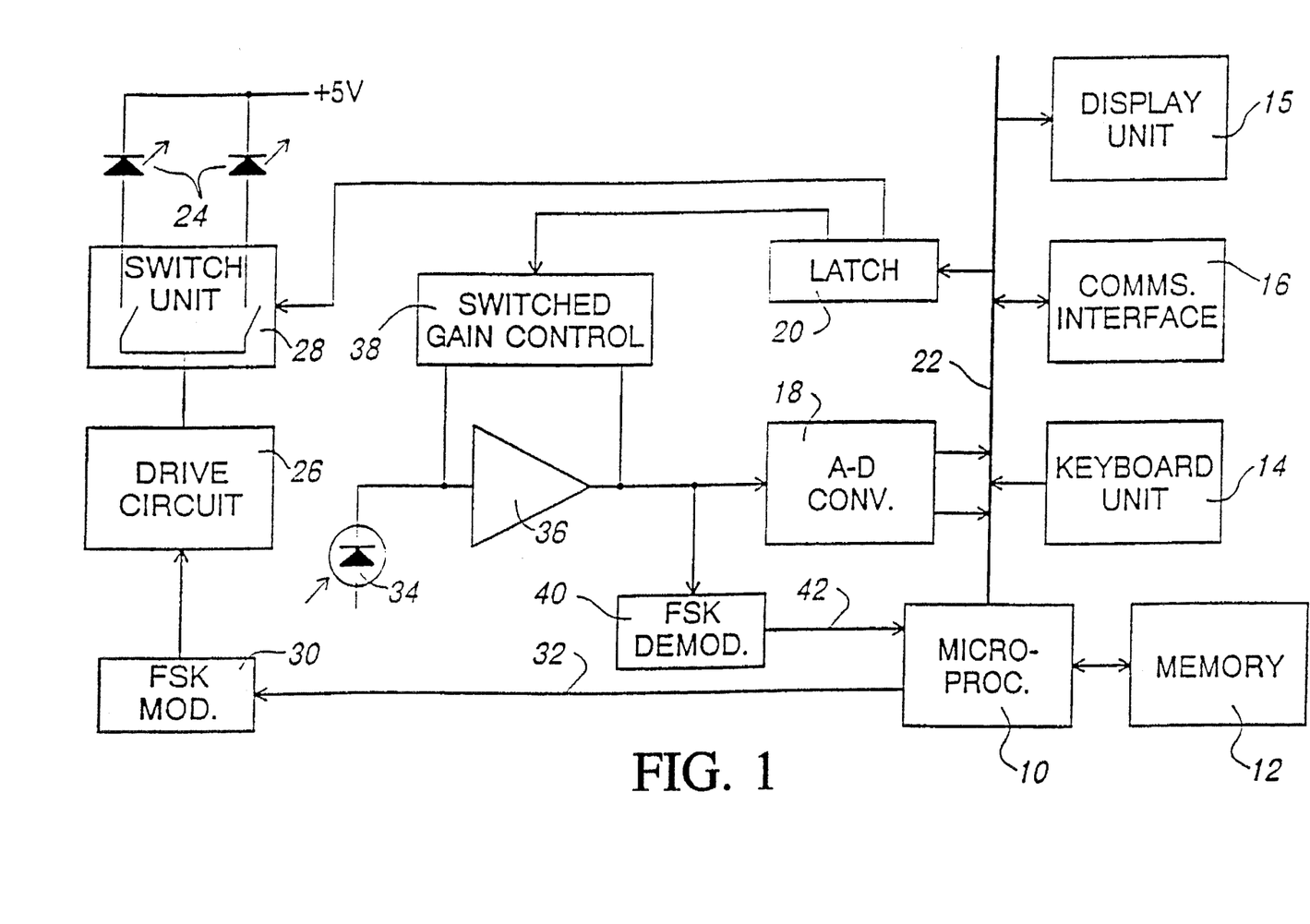
FIG. 1 is a block diagram illustrating a first embodiment of the invention comprising apparatus for use in measuring the attenuation of an optical fiber.

The apparatus illustrated in FIG. 1 comprises a microprocessor 10, an associated memory 12 coupled thereto, and a keyboard unit 14, a display unit 15, a communications interface 16, an A-D (analog-to-digital) converter 18, and an 8-bit latch 20 coupled in known manner to the microprocessor 10 via an 8-bit data bus 22. The A-D converter 18 is a 16-bit converter whose most-significant and least-significant byte outputs are separately connected to the bus 22 for supplying these bytes sequentially in operation. The keyboard unit 14 comprises a keyboard and decoder for supplying manually entered information to the microprocessor 10, and the display unit 15 is arranged for displaying information in known manner. The communications interface 16 comprises a UART (Universal Asynchronous Receiver and Transmitter) and RS-232 interface for establishing communications between the microprocessor 10 and a computer (not shown) for exchange of control information and data therebetween in known manner.

The apparatus further comprises a plurality of laser diodes or LEDs (light emitting diodes) 24 having different emission wavelengths at which testing of the attenuation of an optical fiber (not shown in FIG. 1) is to be carried out. The drawing illustrates two laser diodes 24 which may for example emit light at respective wavelengths of 1300 and 1550 nm for testing an optical fiber at these wavelengths, but there may be a different number of diodes 24 and these may have other emission wavelengths. A drive circuit 26, which also includes laser diode temperature compensation and feedback control circuitry of known form, can be selectively coupled to any of the laser diodes 24 via a switch unit 28, the switches of which are controlled by certain bit positions of the latch 20. An optical signal emitted by the selected one of the laser diodes 24 can be modulated with an FSK (frequency shift keyed) modulating signal by an FSK modulator 30 to the drive circuit 26, in accordance with information supplied to the modulator 30 from a transmit port of the microprocessor 10 via a line 32.

A photo-detector 34 can be coupled to an optical fiber (not shown in FIG. 1) under test to receive an optical signal therefrom. The output of the detector 34 is amplified by an amplifier 36 whose gain is determined by a switched gain control circuit 38 which is controlled by other bit positions of the latch 20. For example, the amplifier 36 can comprise two amplification stages in succession, and the circuit 38 can comprise a plurality of resistors and associated switches, controlled from the latch 20, for selectively connecting the resistors in the feedback paths of the amplifiers thereby to determine the gains of the amplifiers.

The output of the amplifier 36 is coupled to an analog input of the A-D converter 18, and to an input of an FSK demodulator 40 whose output is connected to a receive port of the microprocessor 10 via a line 42. In this manner FSK information carried by an optical signal received by the detector 34 can be communicated to the microprocessor 10 via the demodulator 40. In addition, information relating to the amplitude or power level of the received optical signal can be communicated to the microprocessor 10 in digital form via the A-D converter 18 and the data bus 22.

The memory 12 conveniently comprises electrically erasable PROMs (programmable read-only memories) having sufficient capacity (for example 6 Kilobytes) to store calibration values, reference levels, and data acquired in operation of the apparatus. In particular, the memory 12 stores information relating to the sensitivity of the detector 34 to optical signals of different wavelengths, which information is used as described below for setting the switched gain control circuit 38 so that the gain of the amplifier 36 compensates for the wavelength-dependent nature of the detector 34. In this manner the output signal of the amplifier 36 is made independent of the optical signal wavelength and is matched to the conversion range of the A-D converter 18.

For measuring attenuation of an optical fiber, apparatus as illustrated in the drawings is provided at each end of the fiber. The fiber ends may, as previously indicated, be a great distance apart from one another. Although for each direction of transmission of an optical signal via the fiber an optical source is required at only one end of the fiber, with a detector at the other end, generally it is desirable to be able to carry out bidirectional testing, for which the entire apparatus shown in the drawings is provided at each end of the fiber. For clarity and convenience, in the following description the apparatus at one end of the fiber is referred to as "unit A" and the apparatus at the other end of the fiber is referred to as "unit B".

Initially, in each of the units A and B, transmitted optical signal power levels are produced for each testing wavelength and are stored in the memory 12. To this end, individually for each unit an optical fiber jumper is used to connect a selected one of the laser diodes 24 to the detector 34 of the same unit, and the microprocessor 10 is instructed, via the keyboard unit 14 or the communications interface 16, to load the latch 20 with information from the memory 12 for the respective wavelength. As should be appreciated from the preceding description, this information comprises control bits for setting the switch unit 28 to connect the drive circuit 26 to the respective laser diode 24 for the selected wavelength, and control bits for setting the switched gain control circuit 38 to the appropriate gain for this optical signal wavelength in accordance with the wavelength-dependent sensitivity of the detector 34.

A continuous wave optical signal (i.e. no FSK modulation by the modulator 30) is then transmitted from the selected laser diode 24 and received at the detector 34, the resulting signal level at the output of the amplifier 36 being convened into a 2-byte digital value by the A-D converter 18 and this digital value being stored as a transmitted power reference level for this wavelength in the store 12, under the control of the microprocessor 10. This process is repeated for each testing wavelength and in each unit. In subsequent testing, the optical fiber jumper is used for connection of each laser diode 24 to the fiber to be tested, to avoid introducing any testing errors. If a different jumper must be used, for example to accommodate different fiber connectors, then this initial storage of transmitted power reference levels can be easily repeated using the different jumper.

For measuring the attenuation of an optical fiber at each selected wavelength, the fiber is connected at one end via the respective jumper to the selected laser diode 24 in unit A, and is connected at the other end to the detector 34 of unit B. On being instructed via the keyboard 14 or communications interface 16, the microprocessor 10 in unit A controls its switch unit 28 to connect the selected laser diode 24 to the drive circuit 26, and supplies an identification of the respective wavelength via the line 32 to the FSK modulator 30 to be modulated on the optical signal transmitted to the fiber. In unit B at the other end of the fiber, this wavelength identity modulated on the optical signal is demodulated by the FSK demodulator 40 and is supplied via the line 42 to the microprocessor 10. The microprocessor 10 in unit B uses this wavelength identity to read from its memory 12 the appropriate information for setting the switched gain control circuit 38 for this wavelength, and loads its latch 20 accordingly.

The microprocessor 10 in unit A also supplies to its FSK modulator 30 the transmitted power reference level for the selected wavelength, which it reads from the store 12. This information is also transmitted via the fiber being tested to the unit B, where it is demodulated by the FSK demodulator 40 and supplied to the microprocessor 10 in unit B.

The microprocessor 10 in unit A then causes the selected laser diode 24 to transmit a continuous wave (no FSK modulation) optical signal to the fiber being tested, for a predetermined period of, for example, a few seconds. During this period, in unit B the resulting signal level at the output of the amplifier 36 is converted into a digital value by the A-D converter 18 and is supplied to the microprocessor 10 via the data bus 22. The microprocessor 10 in unit B then determines the fiber attenuation from this digital value in comparison to the previously received transmitted power reference level. The determined attenuation, and other information such as the wavelength, transmitted power reference level, and received signal level are displayed by the display unit 15 of unit B, and/or stored in its memory 12 and/or communicated via its communications interface 16.

The above steps of FSK transmission of the selected wavelength, set-up of the switched gain control circuit in the receiving unit B, FSK transmission of the respective transmitted power reference level, and continuous wave transmission of an optical signal with determination of the fiber attenuation, are repeated for each selected wavelength for which the fiber attenuation is to be measured, and are similarly repeated for other fibers in the same optical fiber cable. It should be noted that the initial step of storing transmitted power reference levels, and the monitoring to determine the fiber attenuation at each wavelength, are both carried out using continuous wave optical signals, so that errors due to the effects of modulating signals are avoided.

Similar procedures can be followed for attenuation measurement for the opposite direction of transmission of optical signals.

In an embodiment of the invention, the FSK modulation was arranged to use shift frequencies of 1 and 2 kHz to represent binary values, with a transmission rate of 150 baud using 1 start bit, 8 data bits, and 1 stop bit. ASCII codes were used to specify the wavelength information, and code characters used for transmission of error codes. Each unit had either two or three optical sources 24 for attenuation measurement at two or three different wavelengths, any one (or none) of which was determined by bit positions of the latch 20, the remaining six bit positions of the latch being available for controlling the switched gain control circuit.

It should be appreciated that the apparatus as described above additionally provides, through the FSK modulator and demodulator in each unit, a general purpose communications channel, either in one direction at a time, from the unit A to the unit B as described above, or simultaneously in both directions between the units A and B using two selected fibers, one for each transmission direction. Such a channel can be used for transmitting other desired information, such as text, error messages, control instructions, etc., and also can be used at the end of a measurement operation to communicate test results between the two units.

Figure 2:
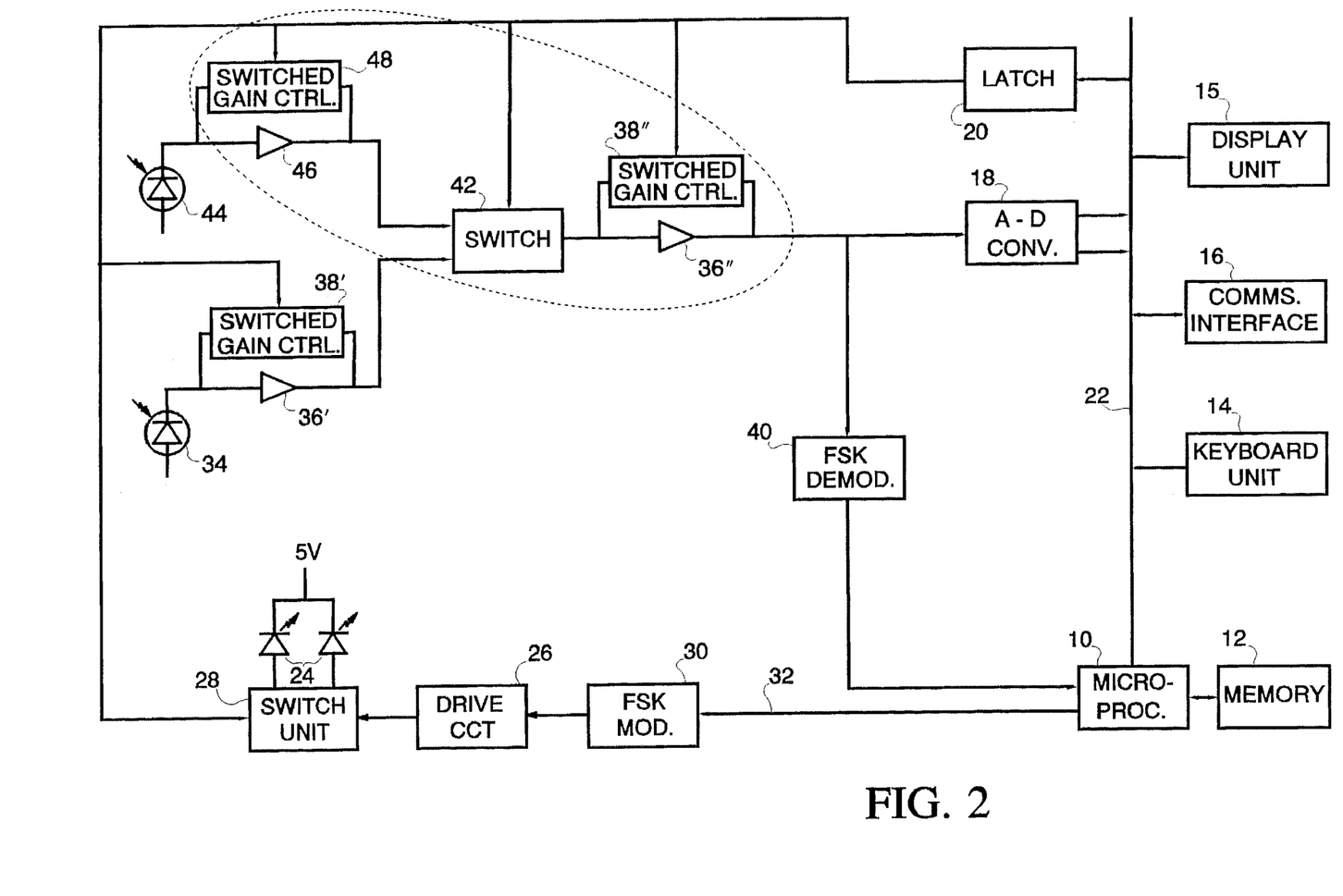
FIG. 2 is a block diagram illustrating a second embodiment of the invention comprising apparatus for use in measuring the attenuation of an optical fiber.

In some cases, however, it is preferable to conduct the measurement using only the fiber under test. FIG. 2 illustrates apparatus according to a second embodiment of the invention which is capable of measuring the attenuation of the fiber under test without a second fiber being used for communications.

For convenience, components of the apparatus shown in FIG. 2 have the same reference numbers as corresponding components in FIG. 1.

The apparatus illustrated in FIG. 2 is similar to that of FIG. 1 in that it comprises a microprocessor 10 which has a memory 12 and is coupled via a common bus 22 to a keyboard unit 14, display unit 15, communications interface 16, A-D converter 18 and latch 20. Two sources 24 are again supplied by a drive circuit 26 and selected by switch unit 28 under control of the microprocessor 10. The microprocessor 10 communicates, as before, with FSK modulator 30 and FSK demodulator 40, conveniently by means of an internal UARTS interface. In the description relating to FIG. 1, it was mentioned that the amplifier 36 connecting the detector 34 to the A-D converter 18 could comprise two amplifiers in tandem. The apparatus shown in FIG. 2 has two such amplifiers, 36' and 36", with corresponding switched gain control circuits 38' and 38". The output of amplifier 36' is connected to one input of a selector switch 42, which also is controlled by the microprocessor via latch 20, and the output of the selector switch 42 is connected to the input of amplifier 36".

A more significant difference between the apparatus of FIG. 2 and that of FIG. 1 is the inclusion of a second detector 44 with its own amplifier 46 and switched gain control circuit 48, the latter controlled by latch 20. The output of amplifier 46 is connected to a second input of the selector switch 42. Thus, the selector switch 42 can be controlled by particular bit positions of the latch 20 to select either the signal from the first detector 34 or the signal from the second detector 44 for application to the A-D converter 18. The microprocessor 10 can measure the power of either signal, each time in the manner previously described with reference to FIG. 1. In view of the added functions, the microprocessor 10 will have additional programming and the memory 12 will store additional data, such as sensitivity information for the second detector and a primary power reference level as will be explained later.

Figure 3:
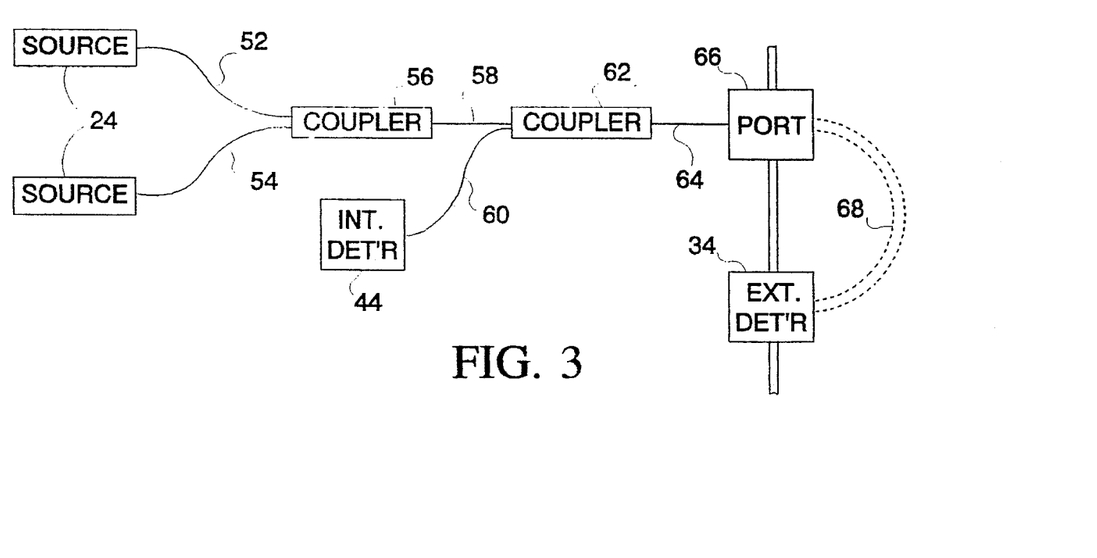
FIG. 3 illustrates the configuration of optical components of the apparatus of FIG. 2.

The optical configuration of the apparatus of FIG. 2 also differs, as shown in FIG. 3. The two sources 24 are coupled optically by respective optical fibers 52 and 54 to a wave-division multiplex (WDM) optical coupler 56. The output of the WDM optical coupler 56 and internal detector 44 are connected by way of optical fibers 58 and 60, respectively, to a wavelength-independent beam splitting optical coupler 62, the output of which is coupled by an optical fiber 64 to a port 66. The coupler 62 allows light from both sources 24 to be transmitted via port 66 but directs light returning via port 60 to the internal detector 44. When either of the two sources 24 is actually transmitting, whether the modulated signal or the continuous wave signal, the microprocessor 10 turns off the internal detector 34 to avoid noise due to reflections. For the same reason, when the unit is receiving an optical signal, the microprocessor 10 turns of the sources.

An optical fiber jumper 68, used to connect the fiber under test to the port 64, is shown in FIG. 3 looped back and connected to the first detector 34. As described earlier with reference to FIG. 1, this enables the transmitted reference power level delivered to the adjacent end of the fiber under test 70 (FIG. 4) to be ascertained by a calibration step carried out before actual measurement of attenuation takes place. During this calibration step, the microprocessor 10 operates the switch 42 to couple the amplifier 36' and the amplifier 36' in series to pass the signal from detector 34 to A-D converter 18. The microprocessor 10 measures the transmitted power reference level and stores it in memory 12 in the manner previously described. This transmitted power reference level is the power which will be transmitted into the adjacent end of the fiber under test when the jumper 68 is connected to it.

Figure 4:
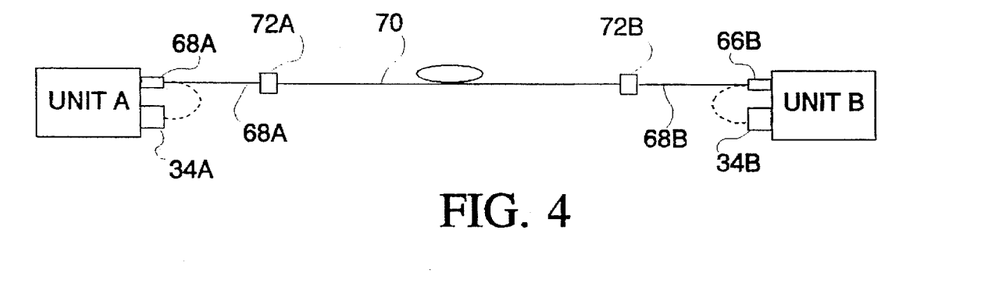
FIG. 4 illustrates connection of two such apparatuses to a fiber under test.

Referring to FIG. 4, in which the suffixes A and B are used to denote corresponding components of unit A and unit B, in order to measure the attenuation of the fiber under test, the ports 66A and 66B of the two units A and B are connected to the fiber 70 by their jumpers 68A and 68B and optical connectors 72A and 72B, respectively. It should be noted that there is then nothing connected to their respective first or external detectors 34A and 34B. Communication of acknowledgements and measurements takes place bidirectionally and in half-duplex between ports 64A and 64B and via the fiber under test 70. As before, the unit operating as transmitter will transmit its transmitted reference power level by modulating the information onto the optical signal being transmitted.

When the unit is operating as a receiver or power meter to measure attenuation, its microprocessor 10 operates its switch 42 to select the output of amplifier 46 and supply the optical signal detected by second detector 44 to the A-D converter 18 and FSK demodulator 40. It will demodulate the received signal, as before, to determine the transmitted power reference level. The power level measured by the internal detector 44 of the receiving unit will lower than that at the adjacent end of the fiber 70 due to loss in its own jumper, the connection between the jumper and the receiving unit's port 66, and loss in the optical path between the port 66 and the internal detector 44.

The loss in the optical path between the detector 44 and the optical port 66 is determined during an initial calibration and stored in memory 12 before the unit leaves the factory. The loss between the optical port 66 and end of the fiber under test 70 will include connector loss and the attenuation due to the jumper 68 itself. The connector loss may vary due to an accumulation of dirt or scratches so, periodically, a maintenance calibration is carried out using a short jumper which is supplied with the unit. This short jumper is connected between the port 66 and the external detector 343 and a "primary" power reference level measured in the same way that the transmitted reference power level is measured. The difference between the primary reference power level and the transmitted reference power level for a particular jumper represents the loss for the jumper and its connection. The short jumper is used only for such periodic maintenance calibrations and so is kept in good condition. Also, it has a core larger than that of the fibers within the unit. Consequently, for most applications, it is assumed that all of the light entering the short jumper reaches the detector 34. The difference between this primary power reference level and the transmitted power reference level for a particular fiber jumper is taken as the power loss attributable to that jumper and stored in memory 12 for use in determining attenuation. This primary power reference level will be determined at regular intervals, perhaps as part of regular maintenance.

Thus, in determining the attenuation of the fiber under test, the receiving unit will subtract from the transmitted reference power level the loss due to its own jumper and the loss of its internal optical path.

In practice, the internal path loss may be taken into account in calibrating the detector, obviating the need to account for it in the calculations.

The transmitted power reference level for each unit will be measured at the start of the day, and whenever the jumper is changed. A typical testing procedure is then as follows:

| UNIT A | UNIT B |
|---|---|
| - User operates key establishing Unit A as master | |
| -Unit A selects its first source 24 and modulates the signal for 2.5 seconds. (This gives time for unit B, acting as the power meter, to select the right gain factor). | - Unit B selects the right gain factor |
| - Unit A transmits the number of sources involved in the test, the wavelength of each source, the reference level of each source and a checksum code that will help the receiving unit to verify the transmission integrity. | - Unit B receives the different wavelengths and reference levels and verifies the integrity of the received codes before using them. The power meter is set at a wavelength. The corresponding to unit A's first source's wavelength. The power meter is set in dB mode and uses the first reference received. |
| - Unit A stops modulating and transmits, for each source, a CW (continuous wave) signal for 5 seconds; for which unit B is to measure the received signal. | - Unit B averages 8 samples of the incoming power and calculates the loss of the fiber under test (FUT) for the first wavelength. This result is displayed on the screen of the unit and is also kept in memory, to be sent later to the master unit A. The power meter selects the second wavelength and reference, sent by unit A, measures (8 samples) and calculates the loss of the FUT at the second wavelength. The result is displayed and kept in memory. |
| - Unit A turns off it's sources 24 and switches to receiver mode to receive codes from unit B. | - Unit B turns on it's source, modulates and waits for 2.8 seconds, giving unit A time to select the right gain factor. |
| - Unit A receives the two "A to B" attenuations, the wavelengths of unit B's sources, their references and a checksum. Unit A verifies the integrity of the transmission. It then displays both attenuations measured by unit B. Both attenuations will be stored in non-volatile memory. | - Unit B sends both attenuations, the wavelength of it's own sources and their reference power levels, plus a checksum. This transmission serves as an acknowledgement that everything was satisfactory so far. |
| - Unit A then averages the power level for 8 samples of the incoming signal and calculates the loss of the FUT for the first wavelength. This result is displayed on the | - The unit stops modulating and transmits, from each source, a CW (Continuous wave) signal for 5 seconds for which unit A, now acting as the power meter, |

-continued

| UNIT A | UNIT B |
|---|---|
| screen of unit A and is also stored in non-volatile memory, to be sent later to the slave unit. The power meter selects the second wavelength and reference, sent by unit B, measures (8 samples) and calculates the loss of the FUT at the second wavelength. The result is displayed and stored in non-volatile memory. | will measure the received signal. |
| - Unit A turns on its source and starts transmitting to unit B the attenuations it has just measured. Unit A then beeps, indicating the end of the test. | - Unit B turns off its sources and receives the set of attenuations measured by unit A. Those attenuations will be displayed on the screen of the unit. The unit will beep, telling the user that the test is finished. |

Using the fiber under test for bidirectional communications, rather than using a second fiber, leads to significant savings in the time taken to measure the optical fibers of a typical telecommunications cable.

The internal detector 44 may also be used to measure backreflection.

Although particular embodiments of the invention have been described in detail, it should be appreciated that numerous modifications, variations, and adaptations may be made thereto without departing from the scope of the invention as defined in the claims.

We claim:

1. A method of measuring attenuation of an optical fiber using two transceiver units, one at each end of the optical fiber, each transceiver unit comprising a port, an optical source, a first optical detector, a second optical detector, storage means, coupling means for coupling the optical source and the first detector alternatively to the port for selectively transmitting optical signals to, and receiving optical signals from, the optical fiber via the port, and data storage means;

the method comprising the steps of, at each unit:

connecting a first jumper between the port and the second optical detector of the same unit and causing the source to transmit a first optical signal having a predetermined wavelength to the second detector via the first jump, measuring the power level of the first optical signal when received by the second detector and storing it in the storage means as a primary reference power level;

removing the first jumper and connecting a second jumper between the port and the second detector of the same unit, causing the source to transmit a second optical signal, having the same wavelength and power level as the first optical signal to the second detector via the second jumper, measuring the power level of the second optical signal when received by the second detector and storing it in the storage means as a transmitted reference power level;

the difference between the power level of the second optical and the primary reference power level being the loss of the second jumper;

the method further comprising the steps of connecting the second jumper between the port and an adjacent end of the optical fiber and;

at one of the units;

transmitting a third optical signal from its source via its second jumper to the optical fiber;

modulating the third optical signal with information representing said transmitted power reference level;

at the other of the units;

detecting, using its first detector, the third optical signal received via its second jumper and port from the optical fiber;

demodulating the detected third optical signal to recover information as to the transmitted reference power level of the detected optical signal; and determining attenuation of the optical fiber at said predetermined wavelength using the power level of the received third optical signal measured at its first detector, the recovered transmitted reference power level demodulated from the detected third optical signal, and the primary reference power level and transmitted reference power level from its storage means.

2. A method as claimed in claim 1, further comprising the prior step of calibrating each unit to determine a level of signal loss between the optical port and the first detector, the attenuation measurement taking account of said signal loss.

3. A method as in claim 1, wherein the third optical signal is transmitted as a continuous wave signal following the modulation with said information, and the power level of the received third optical signal is determined by measuring a received power level of the continuous wave signal.

4. A method as claimed in claim 1, wherein each transceiver unit has a plurality of sources having different wavelengths and means for selecting a source for transmission, and wherein, at said one or the units, the step of modulating the optical signal includes modulating the optical signal with information identifying the wavelength of the optical signal, the method further comprising the step, at said other of the units, of reading wavelength-dependent detection sensitivity information in dependence upon the recovered wavelength information, the step of demodulating recovering the wavelength information, and the determination of attenuation using the detection sensitivity information.

5. A method as claimed in claim 3, wherein the step of modulating comprises FSK modulation.

6. Apparatus for measuring attenuation of an optical fiber comprising two transceiver units for connection one at each end of the optical fiber, each transceiver unit comprising:

a port to receive, exteriorly, a connector of the optical fiber to be measured, an optical source, a first detector, a second detector, storage means, coupling means for coupling the optical source and the first detector, alternatively and interiorly, to the port, interiorly, for selectively transmitting optical signals to, and receiving optical signals from, the optical fiber via the port, and data storage means for storing power levels of signals received by the detectors;

first jumper means having connectors for connecting it between the port and the second detector and second jumper means having connectors for connecting it, alternatively, between the port and the second detector and between the port and the optical fiber, the first jumper means having significantly lower toss characteristics than the second jumper means;

means for controlling the optical source and the coupling means to supply to the port, alternatively and successively, first, second and third optical signals having the same wavelength and initial power level and storing in the storage means first and second reference power levels of the first and second optical signals measured at the second detector with the first jumper and the second jumper, respectively; connected between the port and the second detector;

means for modulating the third optical signal, prior to transmission via the port, with information representing said second reference power level;

means for demodulating a detected optical signal received by the first detector via the optical fiber having been transmitted as a said third optical signal by another said transceiver unit connected to a distal end of the optical fiber, to recover information as to the transmitted second reference power level of the detected optical signal as modulated thereupon prior to transmission by said another transceiver unit;

means for determining attenuation of the optical fiber at the predetermined wavelength using the second reference power level demodulated from the detected optical signal, the first reference power level from the storage means and a measured power lever of the detected optical signal.

7. Apparatus as claimed in claim 6, wherein the detector and port are interconnected by optical fibers and the first jumper means comprises a relatively short length of optical fiber having a core diameter greater than core diameters of the interconnecting optical fibers.

8. Apparatus as claimed in claim 6, wherein the optical source is one of a plurality of optical sources for supplying optical signals having different wavelengths, the coupling means selecting one of the sources, the storage means stores wavelength-dependent information for the first detector, the modulating means modulates the third optical signal with information identifying the wavelength of the selected source, the demodulating means identifying from the detected signal both the wavelength and second reference power level of the detected optical signal, the determining means being responsive additionally to the recovered wavelength information for reading sensitivity information from the store; and determining attenuation of the optical fiber at the predetermined wavelength using, additionally, the sensitivity information.

9. Apparatus as defined in claim 8, wherein the means for determining attenuation of the optical fiber at the predetermined wavelength comprises means for amplifying the detected optical signal with a gain dependent upon the sensitivity information read from the store to produce a wavelength-independent received power level signal.

10. Apparatus as claimed in claim 9, wherein the means for determining attenuation of the optical fiber at the predetermined wavelength further comprises means for converting the wavelength-independent received power level signal to a digital value.

11. Apparatus as claimed in claim 8, and including latch means for latching said sensitivity information read from the store and information for selecting said one of the optical sources.

12. A method of measuring attenuation of an optical fiber using a transmitter unit having an optical source, a port, an optical detector and storage means, the port being connected interiorly of the unit to receive light signals from the optical source, and a jumper connected at one end to the port and having at its other end means for connection exteriorly of the unit, alternatively, to an end of optical fiber to be measured and to the optical detector, the method comprising the steps of, at the transmitter:

connecting said other end of the jumper to the optical detector, transmitting from the source an optical signal having a predetermined wavelength, measuring at the detector a reference power level of the transmitted signal, and storing the measured reference power level in the storage means;

connecting said other end of the jumper to an adjacent end of the optical fiber;

transmitting an optical signal having the predetermined wavelength via the jumper to the fiber; and modulating the optical signal with information identifying the previously measured reference power level; and, at a receiver:

detecting the optical signal received from the fiber;

demodulating the detected optical signal to recover the transmitted reference power level information;

monitoring a received power level of the optical signal; and determining attenuation of the optical fiber at said predetermined wavelength from the recovered transmitted power information and the monitored received power level.

13. A method as claimed in claim 12, wherein the transmitter unit has a plurality of sources having different wavelengths and means for selecting a source for transmission, and wherein, at the transmitter, the step of modulating the optical signal includes modulating the optical signal with information identifying the wavelength of the optical signal, the method further comprising the step, at the receiver, of reading wavelength-dependent detection sensitivity information in dependence upon the recovered wavelength information, the step of demodulating recovering the wavelength information, and the determination of attenuation using the detection sensitivity information.

14. A method as claimed in claim 13, wherein the steps of monitoring a received power level of the optical signal and determining attenuation of the optical fiber comprise the step of amplifying the detected optical signal with a gain dependent upon the detection sensitivity information to produce a wavelength-independent received power level signal.

15. A method as claimed in claim 13, wherein the step of monitoring the received power level of the optical signal comprises the step of converting the wavelength-independent received power level signal to a digital value.

16. A method as claimed in claim 10, wherein the transmitted power information comprises a digital signal.

17. Apparatus for use in measuring attenuation of an optical fiber, comprising: an optical source and an optical detector, a port, coupling means coupling the optical source to the port interiorly of the unit, jumper means for connecting at its one end to the port, and at its other end, alternatively to the optical detector and an adjacent end of the optical fiber; means for controlling the optical source to supply first and second optical signals both having a predetermined wavelength and the same power level to the port; means for storing a first reference power level of the first optical signal measured at said optical detector with the jumper means connected to the detector; means for modulating the second optical signal with information identifying the stored first reference power level; means for demodulating a detected optical signal received from the detector with the jumper connected to the optical fiber to recover information identifying the transmitted power level modulated thereupon; means for determining a power level of the detected optical signal, and means for determining attenuation of the optical fiber from the recovered transmitted power information and the power level of the detected optical signal.

18. Apparatus as claimed in claim 17, wherein the optical sources comprise a plurality of laser diodes having different emission wavelengths.

19. Apparatus as claimed in claim 17, wherein the means for modulating and demodulating comprise an FSK modulator and demodulator.

* * * * *